(12) United States Patent
Briliauskas

(10) Patent No.: US 11,966,789 B2
(45) Date of Patent: Apr. 23, 2024

(54) SYSTEM AND METHOD FOR QUEUING NODE LOAD FOR MALWARE ANALYSIS

(71) Applicant: UAB 360 IT, Vilnius (LT)

(72) Inventor: Mantas Briliauskas, Vilnius (LT)

(73) Assignee: UAB 360 IT, Vilnius (LT)

(\*) Notice: Subject to any disclaimer, the term of this patent is extended or adjusted under 35 U.S.C. 154(b) by 91 days.

(21) Appl. No.: 17/730,775

(22) Filed: Apr. 27, 2022

(65) Prior Publication Data
US 2023/0350728 A1  Nov. 2, 2023

(51) Int. Cl.
*G06F 9/50* (2006.01)
*G06F 9/48* (2006.01)
*G06F 21/56* (2013.01)

(52) U.S. Cl.
CPC ............ *G06F 9/505* (2013.01); *G06F 9/4881* (2013.01); *G06F 21/562* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2015/0178126 A1* | 6/2015 | Modani | ................ | G06F 9/4881 718/102 |
| 2015/0324690 A1* | 11/2015 | Chilimbi | ................ | G06N 3/063 706/27 |
| 2016/0092274 A1* | 3/2016 | Singh | .................... | G06F 9/5094 718/104 |
| 2016/0147573 A1* | 5/2016 | Shayesteh | ............. | G06F 9/5044 718/104 |
| 2019/0132334 A1* | 5/2019 | Johns | .................... | G06F 21/562 |
| 2021/0240826 A1* | 8/2021 | Kutt | ....................... | G06N 20/00 |

\* cited by examiner

*Primary Examiner* — Eric C Wai
(74) *Attorney, Agent, or Firm* — MOSER TABOADA

(57) ABSTRACT

Systems and methods for optimal load distribution and data processing of a plurality of files in anti-malware solutions are provided herein. In some embodiments, the system includes: a plurality of node processors; a control processor programmed to: receiving a plurality of files used for malware analysis and training of anti-malware ML models; separating the plurality of files into a plurality of subsets of files based on byte size of each of the files, such that processing of each subset of files produces similar workloads amongst all available node processors; distributing the plurality of subsets of files amongst all available node processors such that each node processor processes its respective subset of files in parallel and within a similar timeframe as the other node processors; and receiving, by the control processor, a report of performance and/or anti-malware processing results of the subset of files performed from each node processor.

20 Claims, 3 Drawing Sheets

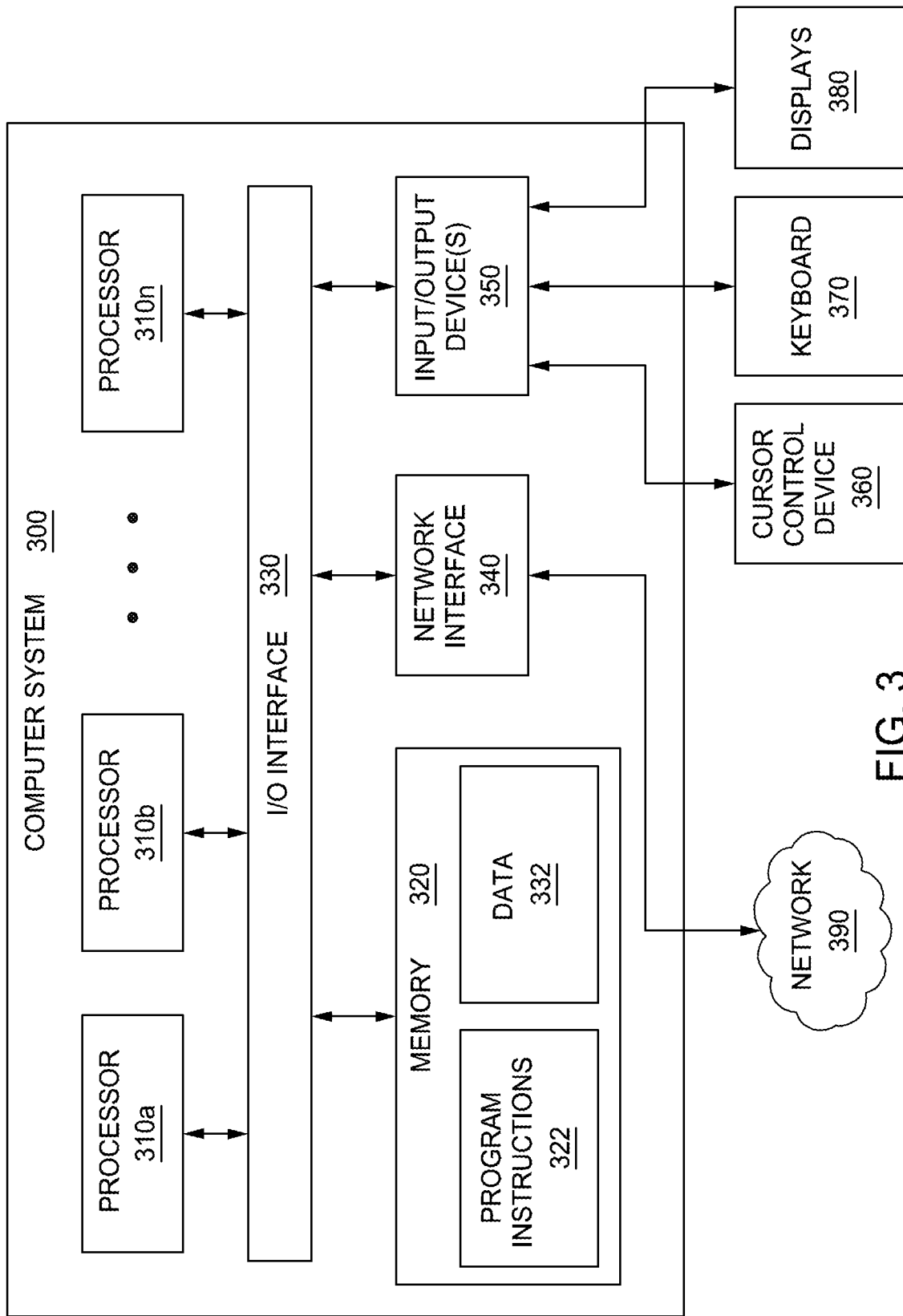

SYSTEM AND METHOD FOR QUEUING NODE LOAD FOR MALWARE ANALYSIS

FIELD

The invention relates generally to data pre-processing for distributed processing of data files, and more particularly to a method for distributed data processing designed for binary files that queue them in a way such that every node receives an optimal load in anti-malware solutions.

BACKGROUND

Data preprocessing involves transforming raw data to well-formed data sets so that data mining analytics can be applied. Raw data is often incomplete and usually has inconsistent formatting. Furthermore, the adequacy or inadequacy of data preparation has a direct correlation with the success of any project that involves data analytics. In malware detection, data often consists of binary files that can be big in size and cannot be easily split. This makes load balancing difficult in malware detection.

Therefore, there is a need for improved methods and systems for queuing node load in data preprocessing in malware detection.

SUMMARY

Systems and methods for optimal load distribution and data processing of a plurality of files in anti-malware solutions are provided herein. In some embodiments, the system includes an input/output device; a plurality of node processors; a control processor programmed to: receiving a plurality of files used for malware analysis and training of anti-malware (AM) machine learning (ML) models; separating the plurality of files into a plurality of subsets of files based on byte size of each of the files, such that processing of each subset of files produces similar workloads amongst all available node processors; distributing the plurality of subsets of files amongst all available node processors such that each node processor processes its respective subset of files in parallel and within a similar timeframe as the other node processors; and receiving, by the control processor, a report of performance and/or malware detection model performance results of the subset of files performed from each node processor.

In other embodiments, a method for optimal load distribution and data processing of a plurality of files in anti-malware solutions includes: receiving a plurality of files used for malware analysis and training of AM ML models; separating, by a control processor, the plurality of files into a plurality of subsets of files based on byte size of each of the files, such that processing of each subset of files produces similar workloads amongst all available node processors; distributing the plurality of subsets of files amongst all available node processors such that each node processor processes its respective subset of files in parallel and within a similar timeframe as the other node processors; and receiving, by the control processor, a report of performance and/or malware detection model performance results of the subset of files performed from each node processor.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3 depicts a high-level block diagram of a computing device suitable for use with embodiments for optimal load distribution and data processing of a plurality of files in anti-malware solutions in accordance with the present principles.

Figure 1:
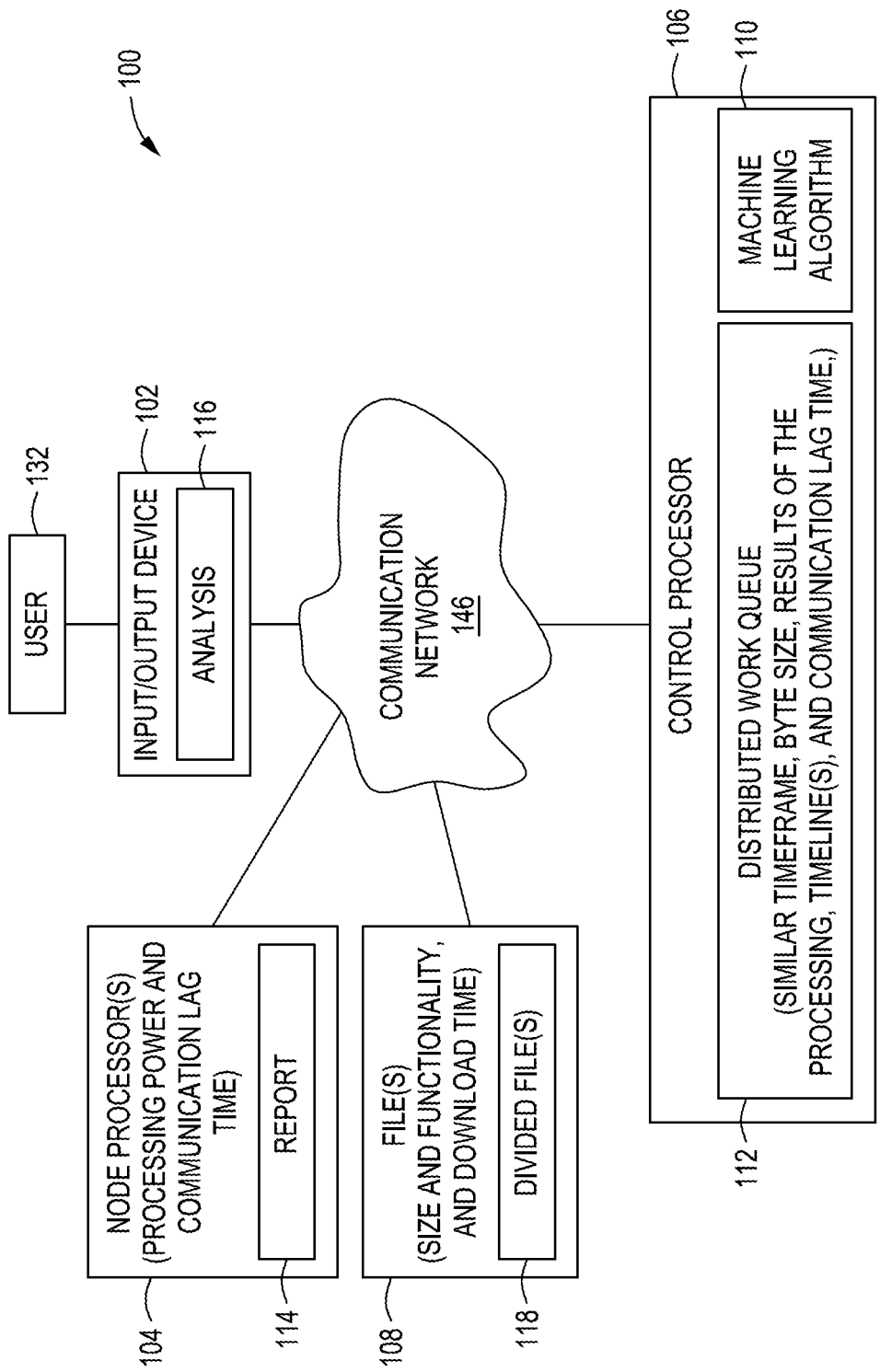
FIG. 1 depicts a high-level block diagram of a network architecture of a system for optimal load distribution and data processing of a plurality of files in anti-malware solutions, in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for optimal load distribution and data processing of a plurality of files in anti-malware solutions. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

The adequacy or inadequacy of data preparation has a direct correlation with the success of any project that involves data analytics. In malware detection, data often consists of binary files that can be large in size and/or cannot be easily split. Moreover, data preprocessing can be computationally intensive, so cloud computing or computing with many nodes can be employed. In this type of distributed training, data is split up and processed in parallel. Each worker node trains a copy of the model on a different batch of training data, communicating its results after computation to keep the model parameters and gradients in sync across all nodes.

The system 100 presented herein uses distributed training designed for binary files that queues them in such a way that every node receives optimal load and so all the selected nodes finish processing data at approximately the same time. This optimizes resource allocation since the process is often finished only with the last node finishing its assigned task.

In other words, system 100 uses computational resource rationing for data pre-processing the load where each node receives a substantially equal load. The system 100 then makes queues with substantially equal total byte size with the expectation that the nodes will operate on the same timeframe and load, and the queues can be made from chunks.

In some embodiments, the system 100 includes an input/output device 102 that a user 132 can use to interact with the system. The system 100 includes one or more node processor(s) 104, and a control processor 106 programmed to receive a plurality of files 108 and separate the plurality of files 108 into multiple subsets of files 118 (also referred to as divided files) according to byte size such that the subsets of files creates a distributed work queue 112 for the node processors that produces similar workloads amongst the node processors 104. The control processor 106 distributes one or more subset of files/divided files 118 to each node processor 104 based upon the distributed work queue 112 so that each node processor can process its respective portion of the divided files in parallel and within a similar timeframe as the other node processors, and all the node processors 104 then report 114 their results of the processing to the control processor. The control processor 106 provides an analysis 116 via the input/output device 102 based upon the control processor's analysis of the node processors' reports 114. Thus, system 100 implements a distributed anti-malware machine learning model training (in relation with machine learning algorithm 110) where data is split up and processed in parallel in such a way that every node receives optimal load and they all finish processing data at approximately the same time. This optimizes resource allocation since the process is often finished only with the last node. More specifically, each of the node processors 104 trains a copy of the anti-malware ML model on a different batch of training data/files, communicating its results back to the control processor 106 to update/train anti-malware machine learning algorithm 110 after computation to keep the model parameters and gradients in sync across all nodes.

In some embodiments, the byte size can be any binary multiple selected by the control processor 106. In other embodiments, the control processor 106 also processes a portion of the divided files 118. In other words, the control processor 106 is not only doing command and control duties in the system 100, but also providing processing capabilities as well.

In some embodiments, the control processor 106 also distributes the portion of the divided files 118 according to the processing power of each node processor 104. Stated another way, the control processor 106 estimates a timeline for each node processor 104 in order to compensate for a heterogeneous processing power mix so that each node processor can report 114 its results at a time similar to all the other node processors. That is, in some embodiments, the control processor also adjusts the numbers of files included in some of the subsets of files according to the processing power of the node processors to which the subsets of files will be sent for processing.

In some embodiments, each divided file 118 matches its respective original file 108 in size and functionality. In other embodiments, the control processor 106 also distributes the portion of the divided files 118 according to each node processor's 104 network 146 communication lag time with the control processor. Stated another way, each processor's 104 network 146 communication lag time is considered when the control processor 106 is determining the timeline for each node processor to report 114 its result of the processing to the control processor.

In some embodiments, the control processor 106 also distributes the portion of the divided files 118 according to the download time of each file with the control processor. In other words, the download time of each file with the control processor is considered by the control processor 106 when determining the timeline for each node processor to report 114 its result of the processing to the control processor.

In some embodiments, the control processor 106 also distributes the portion of the divided files 118 according to the number of files 108 being processed by the system 100. In other embodiments, the node processors 104 report 114 their results for each processed file in real-time.

In some embodiments, the control processor 106 adjusts the distributed work queue 112 based upon the real-time reported 114 results from the node processors 104. Stated another way, the control processor 106 can dynamically adjust the work queue 112 based upon real-time processing data as well as estimated processing data.

In some embodiments, the control processor 106 creates the distributed work queue 112 by assigning workloads in a round robin manner to the node processors 104 based upon the real-time reported 114 results from the node processors. In other embodiments, the control processor 106 creates the distributed work queue 112 by assigning workloads in a weighted round robin manner to the node processors 104 based upon the real-time reported 114 results from the node processors.

In one embodiment, the system 100 communicates over a communications network 146, which enables a signal to travel anywhere within the system and/or to any other component/system connected to the system. The communications network 146 is wired and/or wireless, for example. The communications network 146 is local and/or global with respect to system 100, for instance.

Figure 2:
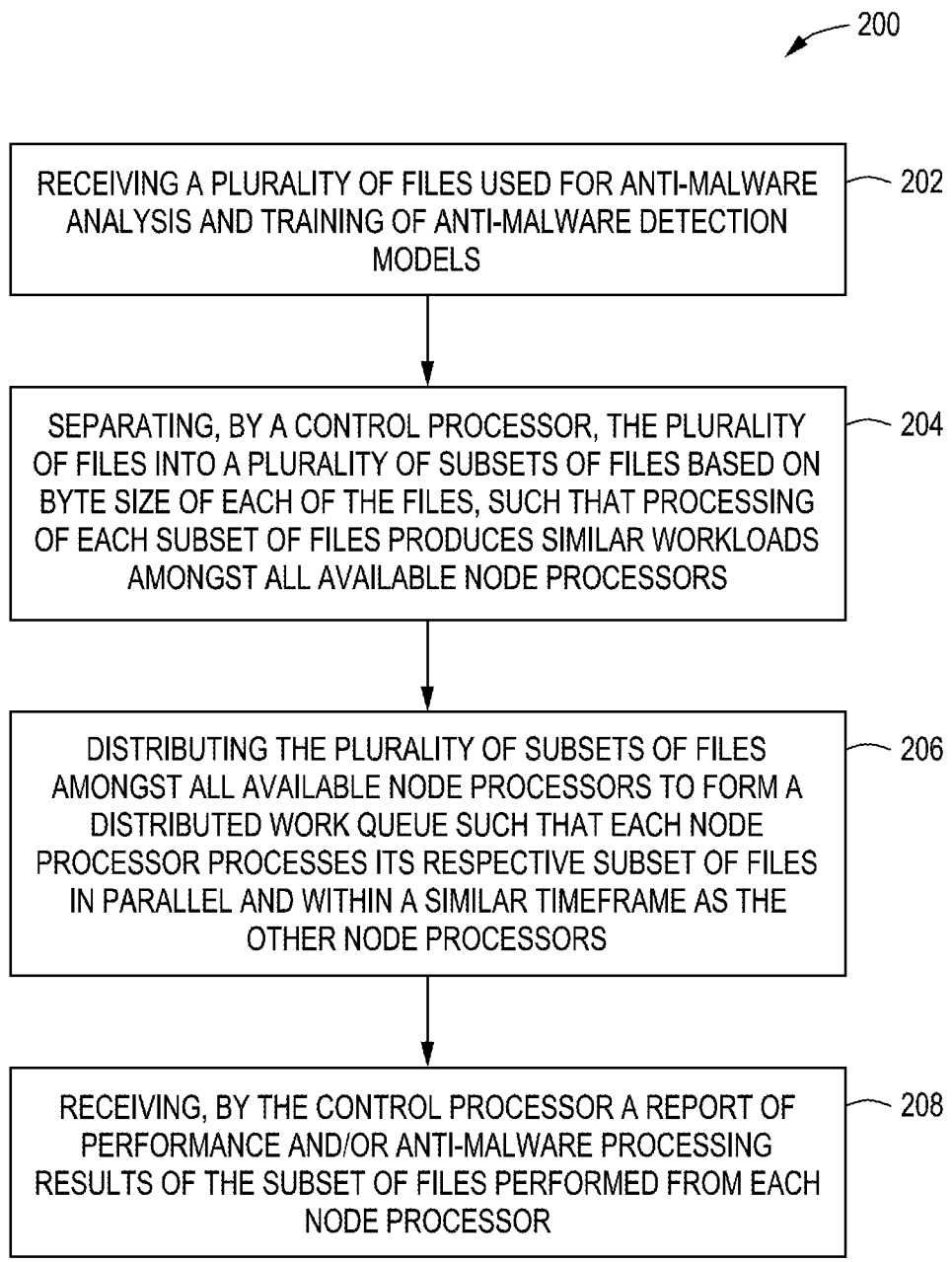
FIG. 2 depicts a flow diagram of a method for optimal load distribution and data processing of a plurality of files in anti-malware solutions, in accordance with an embodiment of the present principles.

FIG. 2 is an example process 200 a flow diagram of a method for optimal load distribution and data processing of a plurality of files in anti-malware solutions, in accordance with an embodiment of the present principles. Such a process 200 may begin at 202 receiving a plurality of files used for malware analysis and training of anti-malware ML models.

The method proceeds to 204 where the control processor 106 separates the plurality of files into a plurality of subsets of files based on byte size of each of the files, such that processing of each subset of files produces similar workloads amongst all available node processors. That is, the subsets of files are created such that, when distributed amongst available node processors, each node processor will be able to process its respective subset of files in parallel and within a similar timeframe as the other node processors. In some embodiments, the subsets are created based on equal or similar byte size counts of the entire subset of files (i.e., each subset of files has a similar total byte size). In some embodiments, the byte size can be any binary multiple selected by the control processor.

In other embodiments, the control processor 106 will take other parameters into consideration. For example, the control processor 106 may adjust the numbers of files included in some of the subsets of files to be processed by some of the node processors according to the processing power of the node processors to which the subsets of files will be sent for processing. For example, more powerful node processors may be sent larger subsets of files to process. The control processor may also distributes the subsets of files according to each node processor's network communication lag time with the control processor.

The method then proceeds to 206 where the plurality of subsets of files are distributed amongst all available node processors to form a distributed work queue such that each node processor processes its respective subset of files in parallel and within a similar timeframe as the other node processors. The processing of the subsets of files performed by each node processor, and in some embodiments the control processor as well, is a malware detection algorithm to determine if files are malicious or not and used to train an anti-malware ML model.

The method ends at 208 where the control processor receives a status report of performance and/or anti-malware processing results of the subset of files performed from each node processor.

FIG. 2 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 3 depicts a computer system 300 that can be utilized in various embodiments of the invention to implement the computer and/or the display, according to one or more embodiments.

Various embodiments of method and system for training a computer security training algorithm, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality, or method of the above-described embodiments. In the illustrated embodiments, computer system 300 may be configured to implement the method 200 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent, or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing, or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390 and communications network 146), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted, or otherwise modified. All examples described herein are presented in a non-limiting manner.

Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

What is claimed is:

1. A computer security system for optimal load distribution and data processing of a plurality of binary files in anti-malware solutions, comprising:
   a plurality of node processors; and
   a control processor programmed for:
      receiving a plurality of binary files used for malware analysis and training of anti-malware ML models;
      separating the plurality of binary files into a plurality of subsets of binary files based on byte size of each of the binary files, and processing workloads amongst all available node processors;
      distributing the plurality of subsets of binary files amongst all available node processors to form a distributed work queue by balancing processing workloads across all available node processors such that each node processor processes its respective subset of binary files in parallel and within a similar timeframe as the other node processors, wherein the control processor also distributes the subsets of binary files according to each node processor's network communication lag time with the control processor; and
      receiving, by the control processor, a report of performance and/or anti-malware processing results of the subset of binary files performed from each node processor.

2. The system of claim 1, wherein the processing of the subsets of binary files performed by each node processor is a malware detection algorithm to determine if binary files are malicious or not and used to train an anti-malware ML model.

3. The system of claim 1, wherein the byte size can be any binary multiple selected by the control processor.

4. The system of claim 1, wherein the control processor also processes one or more of the subsets of binary files.

5. The system of claim 1, wherein the control processor also adjusts the numbers of binary files included in some of the subsets of binary files according to a processing power of the node processors to which the subsets of binary files will be sent for processing.

6. The system of claim 1, wherein the node processors report their results for each processed binary file in real-time.

7. The system of claim 6, wherein the control processor adjusts the distributed work queue based upon the real-time reported results from the node processors.

8. The system of claim 1, wherein the control processor creates the distributed work queue by assigning workloads in a round robin manner to the node processors based upon the real-time reported results from the node processors.

9. The system of claim 1, wherein each node processor trains a copy of a distributed anti-malware ML model by processing its respective subset of binary files.

10. The system of claim 9, wherein each report includes model parameters of the respective copy of the distributed anti-malware ML model, and wherein the control processor is further programmed for synchronizing the model parameters across all node processors.

11. A method for optimal load distribution and data processing of a plurality of binary files in anti-malware solutions comprising:
   receiving a plurality of binary files used for malware analysis and training of anti-malware ML models;
   separating, by a control processor, the plurality of binary files into a plurality of subsets of binary files based on byte size of each of the binary files, and processing workloads amongst all available node processors;
   distributing the plurality of subsets of binary files amongst all available node processors to form a distributed work queue by balancing processing workloads across all available node processors such that each node processor processes its respective subset of binary files in parallel and within a similar timeframe as the other node processors, wherein the control processor also distributes the subsets of binary files according to each node processor's network communication lag time with the control processor; and
   receiving, by the control processor a report of performance and/or anti-malware processing results of the subset of binary files performed from each node processor.

12. The method of claim 11, wherein the processing of the subsets of binary files performed by each node processor is used to train an anti-malware ML model.

13. The method of claim 11, wherein the byte size can be any binary multiple selected by the control processor.

14. The method of claim 11, wherein the control processor also processes one or more of the subsets of binary files.

15. The method of claim 11, wherein the control processor also adjusts the numbers of binary files included in some of the subsets of files according to a processing power of the node processors to which the subsets of binary files will be sent for processing.

16. The method of claim 11, wherein the node processors report their results for each processed binary file in real-time.

17. The method of claim 16, wherein the control processor adjusts the distributed work queue based upon the real-time reported results from the node processors.

18. The method of claim 17, wherein the control processor creates the distributed work queue by assigning workloads in a round robin manner to the node processors based upon the real-time reported results from the node processors.

19. A non-transitory computer readable storage medium having stored thereon a plurality of instructions that when executed by a processor of a computer security system that performs a method of algorithm training comprising:
   receiving a plurality of binary files used for malware analysis and training of anti-malware ML models;
   separating, by a control processor, the plurality of binary files into a plurality of subsets of binary files based on byte size of each of the binary files, and processing workloads amongst all available node processors;
   distributing the plurality of subsets of binary files amongst all available node processors to form a distributed work queue by balancing processing workloads across all available node processors such that each node processor processes its respective subset of binary files in parallel and within a similar timeframe as the other node processors, wherein the control processor also distributes the subsets of binary files according to each node processor's network communication lag time with the control processor; and receiving, by the control processor, a report of performance and/or anti-malware processing results of the subset of binary files performed from each node processor.

20. The non-transitory computer readable storage medium of claim 19, wherein the processing of the subsets of binary files performed by each node processor is used to train an anti-malware ML model.

* * * * *